(12) United States Patent
Bellingan et al.

(10) Patent No.: US 9,659,040 B1
(45) Date of Patent: May 23, 2017

(54) DATABASE FLEET SCHEMA MAINTENANCE

(71) Applicant: Amazon Technologies, Inc., Reno, NV (US)

(72) Inventors: Carl Bellingan, Riebeek West (ZA); Matthew James Eddey, Cape Town (ZA)

(73) Assignee: Amazon Technologies, Inc., Reno, NV (US)

(*) Notice: Subject to any disclaimer, the term of this patent is extended or adjusted under 35 U.S.C. 154(b) by 577 days.

(21) Appl. No.: 14/034,502

(22) Filed: Sep. 23, 2013

(51) Int. Cl.
    *G06F 17/30* (2006.01)

(52) U.S. Cl.
    CPC .. *G06F 17/30292* (2013.01); *G06F 17/30297* (2013.01); *G06F 17/30309* (2013.01)

(58) Field of Classification Search
    CPC ......... G06F 17/30297; G06F 17/30292; G06F 17/30309; G06F 17/30
    See application file for complete search history.

(56) References Cited

U.S. PATENT DOCUMENTS

| | | | | |
|---|---|---|---|---|
| 5,806,062 | A * | 9/1998 | Chen | G06F 17/30569 |
| 6,278,452 | B1 * | 8/2001 | Huberman | G06F 17/30126 |
| | | | | 706/48 |
| 7,769,896 | B2 * | 8/2010 | Liou | G06Q 30/02 |
| | | | | 707/999.006 |
| 8,434,066 | B2 * | 4/2013 | Sharma | G06F 8/38 |
| | | | | 717/126 |
| 8,965,838 | B2 * | 2/2015 | Garg | G06F 17/30917 |
| | | | | 707/602 |
| 2004/0153469 | A1 * | 8/2004 | Keith-Hill | G06F 17/30286 |
| 2006/0085465 | A1 * | 4/2006 | Nori | G06F 17/30297 |
| 2006/0161558 | A1 * | 7/2006 | Tamma | G06F 11/0709 |
| 2007/0088733 | A1 * | 4/2007 | Bodge | G06F 17/30312 |
| 2009/0292745 | A1 * | 11/2009 | Bose | G06F 17/30569 |
| 2011/0145210 | A1 * | 6/2011 | Rathinam | G06F 17/30997 |
| | | | | 707/705 |
| 2012/0023080 | A1 * | 1/2012 | Bolohan | G06F 17/30297 |
| | | | | 707/705 |
| 2013/0085991 | A1 * | 4/2013 | Welden | G06F 17/30297 |
| | | | | 707/634 |
| 2014/0012884 | A1 * | 1/2014 | Bornea | G06F 17/30958 |
| | | | | 707/798 |

* cited by examiner

*Primary Examiner* — Merilyn Nguyen
(74) *Attorney, Agent, or Firm* — Baker & Hostetler

(57) ABSTRACT

A fleet of databases may comprise subsets of databases sharing a common schema for replication, horizontal partitioning and other applications. Events related to potential deviations from a desired schema may be monitored. Automated means may be employed to detect variations from a desired schema. An intermediate representation of database schema may be formed and used to compare database schemas. Subclasses and allowed versions of desired schemas may be defined. Security attributes related to schema inspection and modification may be mapped to enable selected operations on schema.

24 Claims, 10 Drawing Sheets

DATABASE FLEET SCHEMA MAINTENANCE

BACKGROUND

Various applications such as data warehousing, big data, distributed databases and software-as-a-service may utilize a large number of database management systems. These systems may embody various interrelationships expressed by managing databases with similar or identical schemas. For example, in a horizontally-partitioned distributed database, tables possessing a common schema may be managed on a number of computing systems. In other cases, data may be replicated between databases that share a common schema. These and other scenarios may rely on the schema of these databases—or in other words the arrangement of columns, indexes, constraints and other database objects—being similar or identical. However, it may often be necessary to alter database schemas. This task may become increasingly complex as the number of databases under management increases.

BRIEF DESCRIPTION OF DRAWINGS

The drawings provided herein are designed to illustrate example embodiments and are not intended to limit the scope of the disclosure.

DETAILED DESCRIPTION

Various applications involving database management systems may utilize a large number of databases sharing a common schema. For example, a distributed database management system may horizontally partition database tables, so that a portion of each table is managed by a database management system operating on a separate computing node. Each portion of the table shares a common schema, including elements such as the type and order of columns, interrelationship with other tables, indexes and so forth. Another example involves replication, in which data is mirrored between two databases sharing a common schema.

Managing large numbers of databases may involve various actions that require changes to database schema. Examples include deploying new applications and storing new collections of data. Risk may be associated with deploying schema changes to a database, a problem that is compounded when a larger number of databases is involved. The complexity of deploying changes to schema may be further compounded by interrelationships between databases, as may be the case with databases that are replicated or that maintain a portion of a horizontally partitioned table. Various events, such as database downtime, restoring a database from backup, receiving failure indications from a database or installing an application that depends on a database having a particular schema may each contribute to an increased likelihood that one or more databases in the fleet will have an out-of-date or otherwise incorrect schema.

Figure 1:
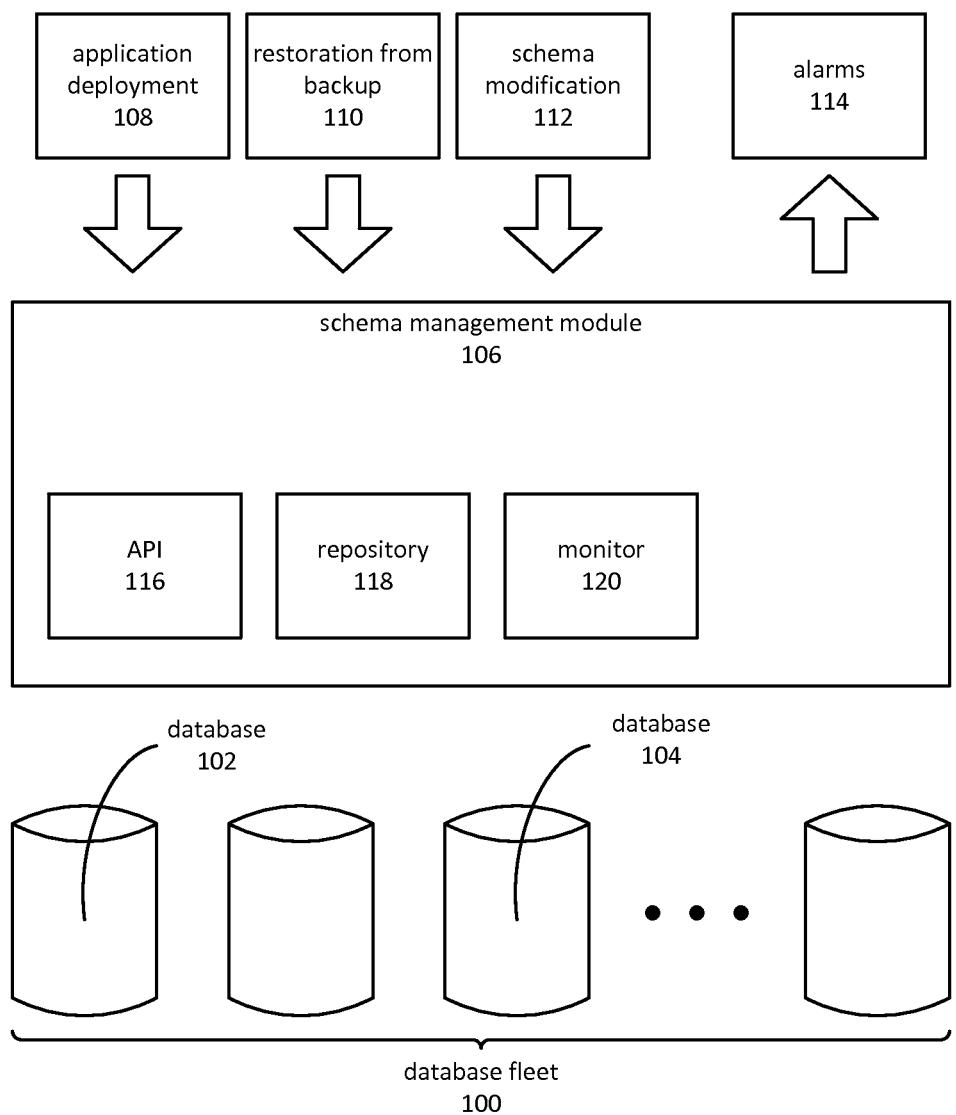
FIG. 1 is a block diagram depicting an embodiment of a system for managing database schema in a fleet of database management systems.

FIG. 1 depicts an embodiment of a system for managing database schema in a database fleet 100. A fleet of databases may consist of many database systems, such as databases 102 and 104, operating on various hardware and software configurations. One or more databases may be configured to operate on one or more computing nodes operating separately, as clusters, as distributed database shards, and so forth.

A database may be associated with one or more schema definitions. Schema may be defined as a definition of the structure used by the database to maintain a collection of data. Schema may include table definitions, column definitions, data types, primary key and foreign key constraints, uniqueness constraints, collation, privilege grants, stored procedures and so forth. Schema may, for example, include information for defining a table maintained by the database as a collection of rows and columns, with columns of various data types. Schema may be used to define relationships between two tables, to grant permission to read or write data stored in a table and so forth.

Database fleet 100 may comprise databases, such as databases 102 and 104, acting in various capacities and configurations. Some databases may be configured to operate as independent databases, while others may be configured to operate in master-replica configurations, as horizontal or vertical partitions and so on.

Databases, such as databases 102 and 104, may provide various interfaces or commands for accessing information describing existing schema, as well as various interfaces or commands for defining new schema or altering existing schema. Typically, databases may grant permission to read and write schema to specific users, such as database administrators.

Embodiments may comprise a schema management module 106, which may act as an intermediate mapping layer between users who are not necessarily full database administrators, but who need to perform certain subsets of schema operations on one or more databases within database fleet 100. This may include operations that involve comparing schema definitions, synchronizing schema definitions and altering sets of data stored within certain tables. Embodiments of schema management module 106 may, as a non-limiting example, provide support for operations typically involved in deploying upgraded versions of applications or other scenarios in which limited changes to schema definitions are called for.

The term module, as used herein, may apply to various combinations of software and hardware, including specialized circuitry, computing nodes configured to perform the indicated functions, storage devices, database management systems and so forth. Various functions may be performed using computer-executable instructions embodied in various libraries, application programs and so forth.

A schema management module 106 may comprise various subcomponents. An application programming interface ("API") 116 may provide a mechanism for invoking various schema management functions, via interfaces, protocols, remote procedure calls and so forth. A user of the API may be termed a client of the API or, more generally, of the schema management module.

A repository 118 may be utilized by a schema management module to maintain information utilized in performing the various functions disclosed herein. A repository may comprise a file stored on a storage device, one or more tables in a database or other storage mechanism. Embodiments may store information such as intermediate representations of database schema, collections of hash keys or checksums corresponding to intermediate representations of database schema, definitions of interrelationship and/or subclasses of schemas, suppressed schema discrepancy alarms and so forth. A repository 118 may also be employed, by various embodiments, to maintain lists of databases in a fleet, so that subsets of databases may be identified to perform schema comparison or other schema-related functions.

A monitor 120 may comprise a process that runs periodically or continuously to monitor databases within a fleet for changes to schema, or to monitor for other conditions that might indicate an increased likelihood of an out-of-date or otherwise incorrect schema. One approach is to fetch schema information from each database on a periodic basis, form an intermediate representation of each database schema, calculate a hash key or checksum, and compare the checksum to a previous value for the same database, or to a hash key or checksum value corresponding to the schema of a reference database. Another approach is to monitor events such as system downtime, restoration from backup, application installations and so forth that might be indicative of one or more databases being out of sync with respect to a desired schema.

Various processes and users may perform various functions that involve inspection and, in some cases, manipulation of database schemas within a database fleet 100. One example is application deployment 108. New applications, or new versions of applications, may require that certain versions of a database exist prior to deploying the application. For example, a new version of an application might require the presence of a new column in a certain table. If the column is not present, the application may be inoperable. Accordingly, embodiments of schema management module 106 may provide a mechanism that is capable of ensuring that any databases to be used by the application have been upgraded. This type of scenario may be challenging when one or two database systems are involved, and may become unmanageable when tens, hundreds or thousands of databases are involved. If schema management module 106 detects an unexpected or unallowed variance in schema, it may trigger an alarm 114, which may be used to trigger an automated or manual response to the event.

Another scenario involves restoration from backup 110. Within database fleet 100, databases 102 and 104 might both be employed to support an application. At some point in time, database 104 might suffer a breakdown of some sort. While database 104 is offline, a schema change might be made to other databases within database fleet 100, such as database 102. When database 104 is restored from backup, its schema definition would be out-of-date with respect to upgraded database 102. Embodiments of schema management module 106 may provide a mechanism for comparing the schema of database 104 to that of other databases employed for the same purpose, such as database 102. If it detects a discrepancy, schema management module 106 may notify various processes and/or users by triggering an alarm 114.

Embodiments of schema management module 106 may also be configured to provide support for schema modification 112. Various database management systems may be configured to permit administrators or "super users" to make schema modifications. In some cases, more granular control may be provided to enable a process and/or user to make schema changes necessary to bring a database into conformance with a standard or preauthorized schema, but without providing the same process and/or user the ability to make arbitrary changes. For example, a database management system may allow a user to make arbitrary changes to the schema of a particular table. In some embodiments, a schema management module may limit the right to make only those changes needed to bring the particular table into conformance with a standardized schema.

Embodiments of the present disclosure may also be practiced in conjunction with software-as-a-service applications, sometimes known as web services. Software-as-a-service includes applications, interfaces, protocols and so forth that may be used to invoke a service operated by a service provider. In some embodiments, a service provider may host a web service at a facility separate from clients, who may access the service through a network such as the Internet. In some embodiments, both the client and the web service may be collocated.

Figure 2:
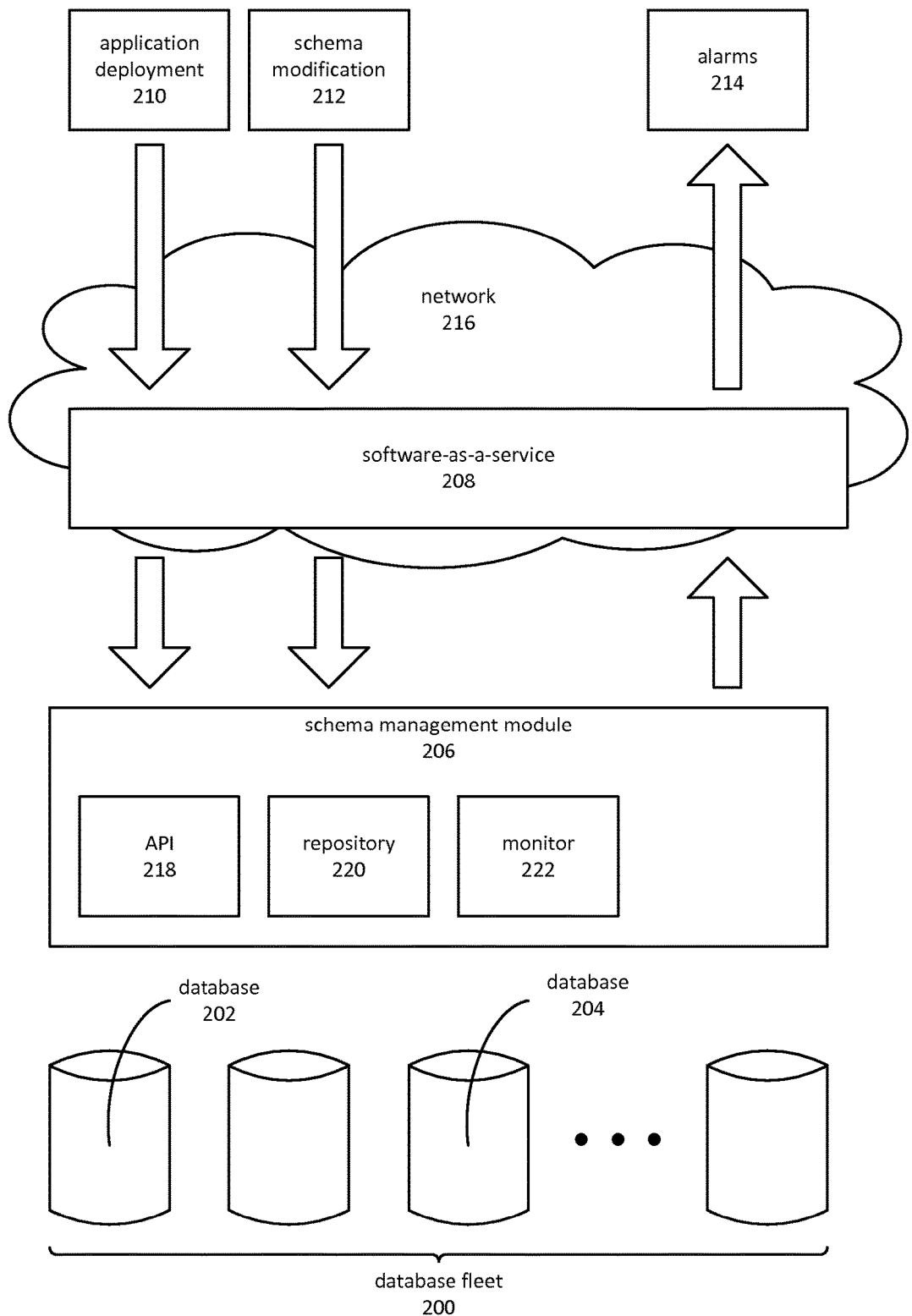
FIG. 2 is a block diagram depicting an embodiment of a system for enabling software-as-a-service customers with access to schema management functions.

FIG. 2 depicts an embodiment of a system for providing database services through a software-as-a-service 208 to users through a network 216. One aspect of providing database services may include providing access and control of certain aspects of database schema management, including schema services related to application deployment 210 and schema modification 212. Clients of the service may also receive notification of alarms 214.

Embodiments may provide alternative capabilities and security mappings between clients and the underlying databases in database fleet 200, as compared to those capabilities and security mappings provided for those involved in maintaining the service. For example, clients of the service may not be involved at all in backup and restoration procedures. These procedures may result in a database's schema becoming out of date with respect to other databases. For example, database 204 could be restored from backup and become out of date with respect to database 202. However, because clients of the service may not be involved in backup and restore operations, they may not be notified of the event and may not have any schema inspection or manipulation privileges granted to them. Another example involves changes to schema. Some columns or other schema information may be controlled by the service provider, and some controlled by the client of the service. Accordingly, each may have different needs and privileges with respect to schema inspection, maintenance and modification. A schema management module 206 may provide support for varying needs of service providers and service clients. Embodiments may, for example, map external clients to a smaller subset of privileges than internal clients. Schema management module 206 may comprise various subcomponents, such as API 218, repository 220 and monitor 222.

In some embodiments, components of a schema management module may be distributed between multiple computing nodes, such as between client computing nodes and those operated at a separate facility by a service provider. One or more of the client computing nodes may operate a database whose schema is mirrored by a database operated by the service provider. Embodiments may utilize components of the schema management module at the client location, for example to monitor for changes to the schema of the database at the client location, to generate an intermediate representation of the client database and so on. An intermediate representation of the schema may be transmitted to a computing node at the service provider location for processing. For example, a process operating at the client location may submit a request to synchronize the schema of the database operated by the service provider with that of the database operated by the client. If a discrepancy is detected, automated and/or manual processes may be performed to synchronize the two databases. For example, comparison of the two schemas may indicate that a column is missing from a table, which could schedule a workflow in which a script is run to add the missing column. Another possibility, among many, is for embodiments to send instructions for rectifying the discrepancy directly to the database.

Figure 3:
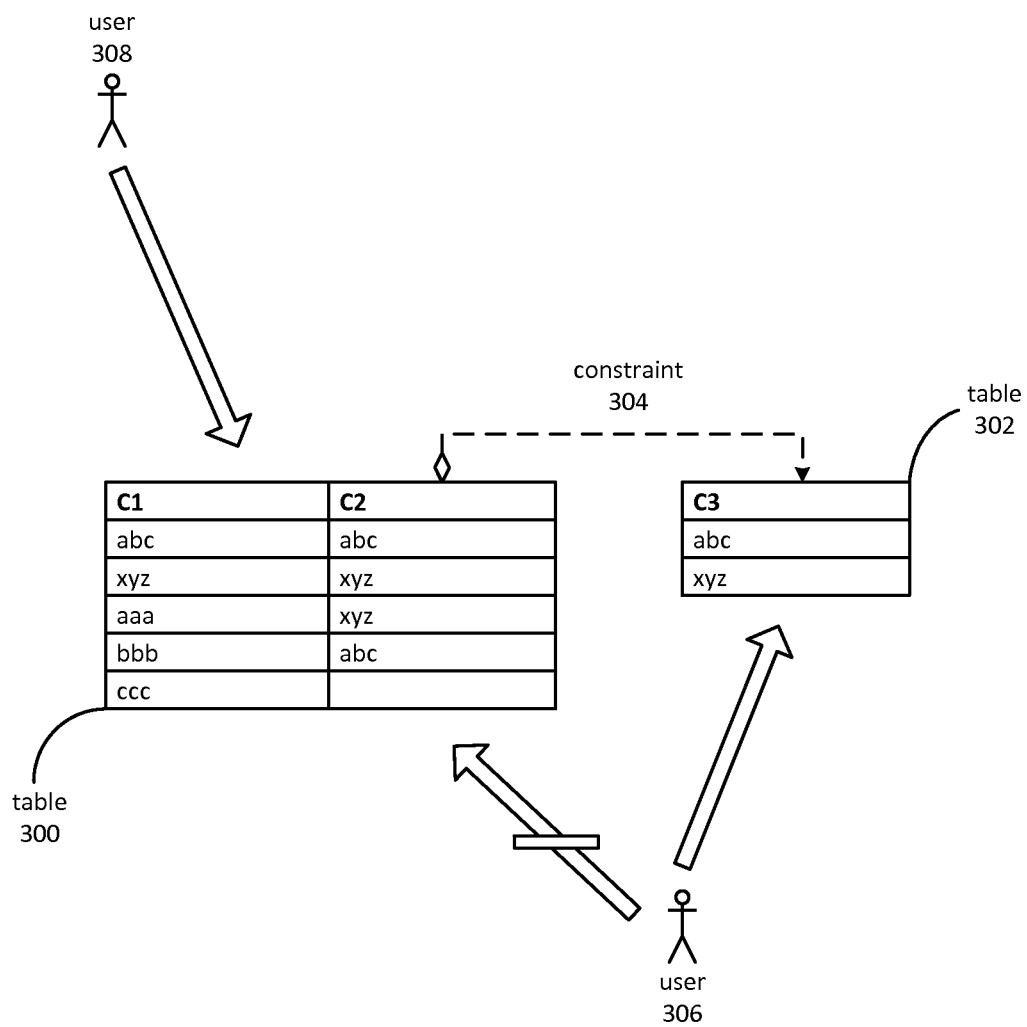
FIG. 3 is a diagram depicting an example of elements of a database schema.

Embodiments of a schema management module may provide a mechanism for comparing database schemas. FIG. 3 provides one example of a database schema. Those of ordinary skill in the art will appreciate that FIG. 3 is illustrative in nature and should not be viewed as limiting the intended scope of the present disclosure. In particular, various schema elements not depicted in FIG. 3 may be included in various embodiments, and various schema elements depicted in FIG. 3 may be excluded.

A database schema may comprise information descriptive of two tables 300 and 302. The information may include an ordered listing of columns in the tables, such as columns "C1" and "C2" in table 300, and column "C3" in table 302. The order of the columns in the table may be considered an aspect of the database schema. So too may be data types, valid data ranges, whether or not the column is nullable, and so forth. Constraint 304 may also be included in the database schema. As depicted, constraint 304 defines a primary and foreign key relationship between table 300 and table 302. Various other constraint types, such as uniqueness constraints, may also be included in the database schema.

Access rights, access control lists, grants and so forth may be included in the database schema. In FIG. 3, this is depicted by user 308 having a right of access to table 300, and user 306 having a right of access to table 302. Schema may also include explicit refusals, as depicted in FIG. 3 by the inability of user 306 to access table 300. In the context of a database schema, access rights may describe the rights of a user known to the database to read and write data, and to modify schema. This is to be distinguished from the access rights of users of a schema management module. A user of a schema management module may have a set of rights that is disjoint from that of a database user.

Figure 4:
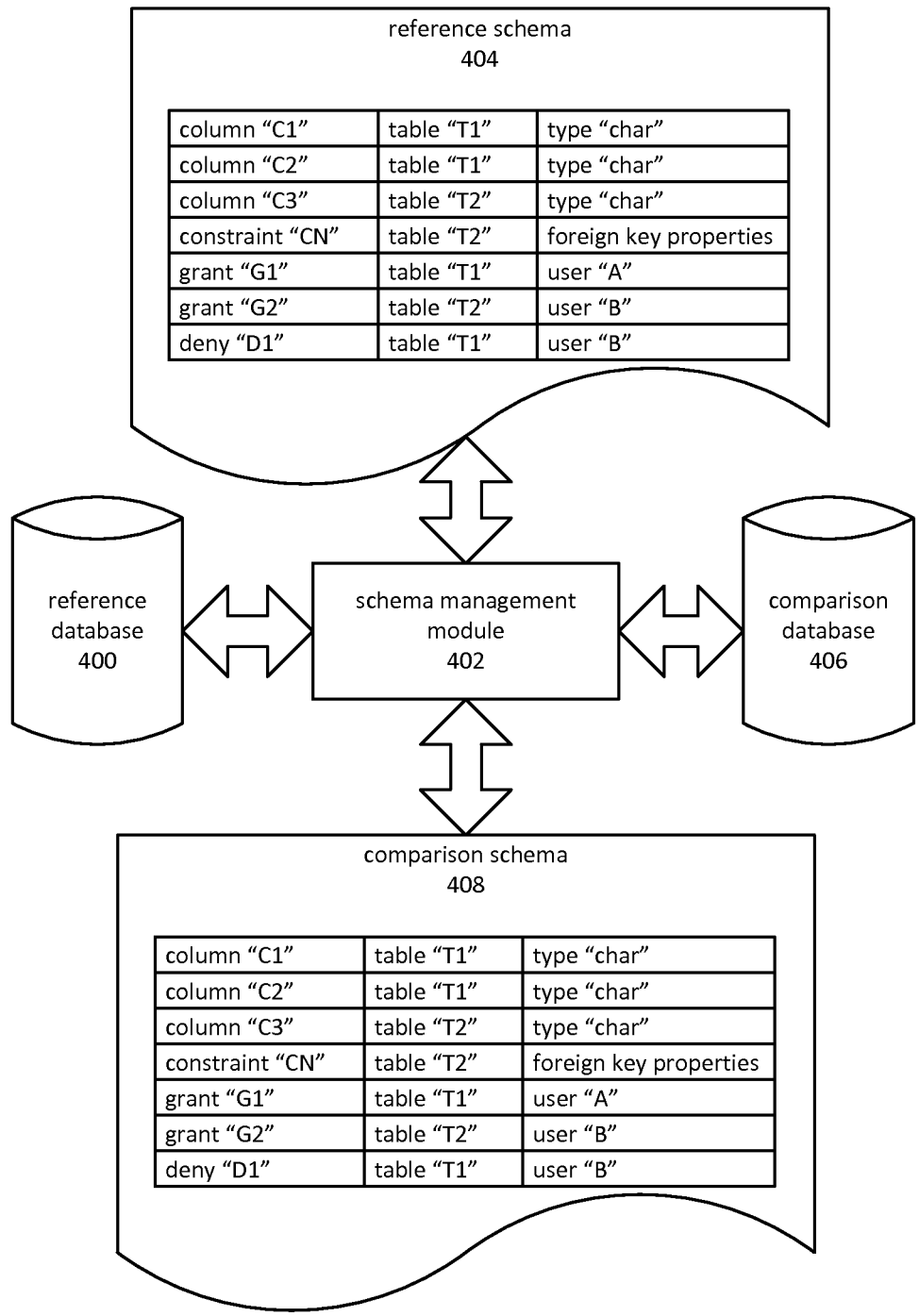
FIG. 4 is a diagram depicting an embodiment of comparing database schemas using intermediate representations.

Embodiments may perform comparison of schema using the mechanism depicted by FIG. 4. A reference database 400 may be used as a baseline for the comparison. Reference database 400 may be selected based on factors such as conformance to a known good state, or an intended state. The former case may be applicable when, for example, a database is restored from backup, and the latter case may be applicable when deploying a new application.

A schema management module 402 may extract schema from database 400 and form an intermediate representation of the schema of database 400. In FIG. 4, the intermediate representation is depicted as reference schema 404. A columnar representation may be employed by some embodiments. Each row in the columnar representation may comprise an object name and a set of associated properties. Embodiments may employ key-value stores in lieu of a columnar representation. However, embodiments may preserve ordering information for certain entries, particularly between columns. The schema for a given table may, for example, consist of three columns "C1," "C2," and "C3," in that order. However, it may be the case that on a certain database, column "C2" was added in a position after column "C3," while on another database "C2" is positioned between columns "C1" and "C3." Some applications may rely on column ordering, and accordingly this difference may be significant for some embodiments. Because of this, embodiments may preserve ordering information between reference database 400 and reference schema 404, and likewise between comparison database 406 and comparison schema 408.

An intermediate format for a database schema may comprise a columnar representation of a wide variety of object types. These may include tables, views, indexes, columns, constraints, stored procedures, custom data types, permission grants, access control lists and so forth. A wide variety of properties may be represented in the intermediate format, associated with corresponding objects. For example, an intermediate format may contain information describing a column that includes column name, column data type and associated constraints.

After reference schema 404 has been generated, it may be compared to other schema representations. Embodiments may extract schema from comparison database 406 and use the information to produce an intermediate representation, such as comparison schema 408. The intermediate formats for reference database 400 and comparison database 406 may then be compared with each other to find discrepancies and similarities.

Comparison of two intermediate format schema representations may involve an initial comparison of a checksum or hash value. Embodiments may employ a message-digest ("MD") cryptographic hash function, such as MD5, for this purpose. In some cases, a subset of an intermediate representation may be used to calculate the hash function. Embodiments may use a subset of the intermediate representation to speed computation of the value, or to ignore portions of the intermediate representation that are not seen as significant for the purpose of comparing schema.

Embodiments may also compare schemas on a row by row basis. Comparison may involve grouping related object types, preserving ordering where necessary. Column definitions are one example where embodiments may preserve ordering information. Groups of related object types may be compared. For example, all of the defined columns for table "T1" as defined in reference schema 404 might be compared to all of the defined columns for table "T1" in comparison schema 408.

Figure 5:
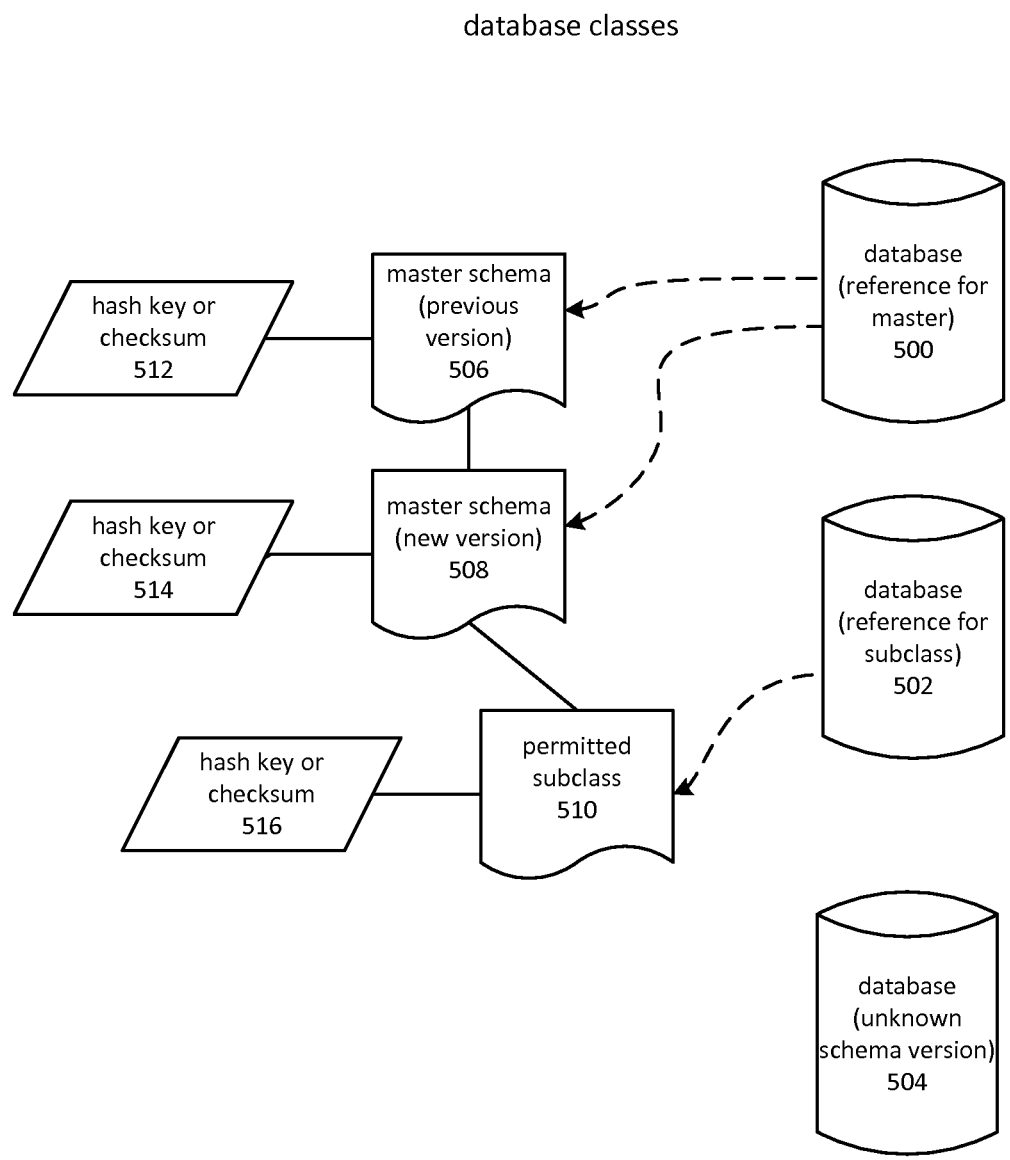
FIG. 5 is a block diagram depicting versions and subclasses of database schemas and intermediate representations of database schemas.

Embodiments may compare schemas in a manner that reflects schema versioning or subclassing. FIG. 5 depicts an illustrative example. Embodiments may extract schema information from database 500 to produce an intermediate representation of a master schema 506. The master schema 500 may be used as a baseline for comparing the schema of various databases. At some point in time, the schema of database 500 may be altered, from which a schema management module may construct master schema 508, representing the current state of reference database 500. Embodiments may perform comparisons using both versions. For example, a database 504 may have an unknown schema, which may be compared to both master schema 506 and master schema 508 to determine which version, if any, it conforms to. Embodiments may provide alarms or reports based on which version is in use.

Embodiments may also support permitted subclasses of schema. For example, database 502 may have a schema similar to database 500, but with some differences that are considered to be acceptable.

Embodiments may construct an intermediate representation of a permitted subclass 510 using a different database, such as database 502, as a reference. Another possibility for constructing subclassed intermediate representations is to define them based on other intermediate representation, such as master schema 508. In some embodiments, intermediate representations of schema are human readable and editable, or can be edited using an editing program. Elements in a subclassed schema may be indicated as optional or specified in the alternative. For example, a new column present only in the subclass could be marked as optional, while a column with a different data type in the subclass could be described twice, once for each optional format. Some embodiments may maintain a separate intermediate representation for each class or subclass, while others allow for classes and subclasses to be specified within a single intermediate representation. Embodiments may store intermediate representations in files stored on disk, in a database table and so forth.

A hash key or checksum value may be generated for each intermediate representation of a schema. For example, hash key or checksum 512 could be generated for master schema 506. The hash keys or checksums may be stored in a table or other structure to enable rapid searching of matching schema types. For example, database 504 might have an unknown schema configuration. An embodiment might generate an intermediate representation of the databases schema, and use it to generate a hash key or checksum value. The embodiment might then search a store of hash key or checksum values such as hash keys or checksums 512, 514 and 516. Depending on the granularity of the hash key or checksum, a matching value would indicate that the schema of database 504 matches, or is likely to match, one of schemas 506, 508 or 510.

Figure 6:
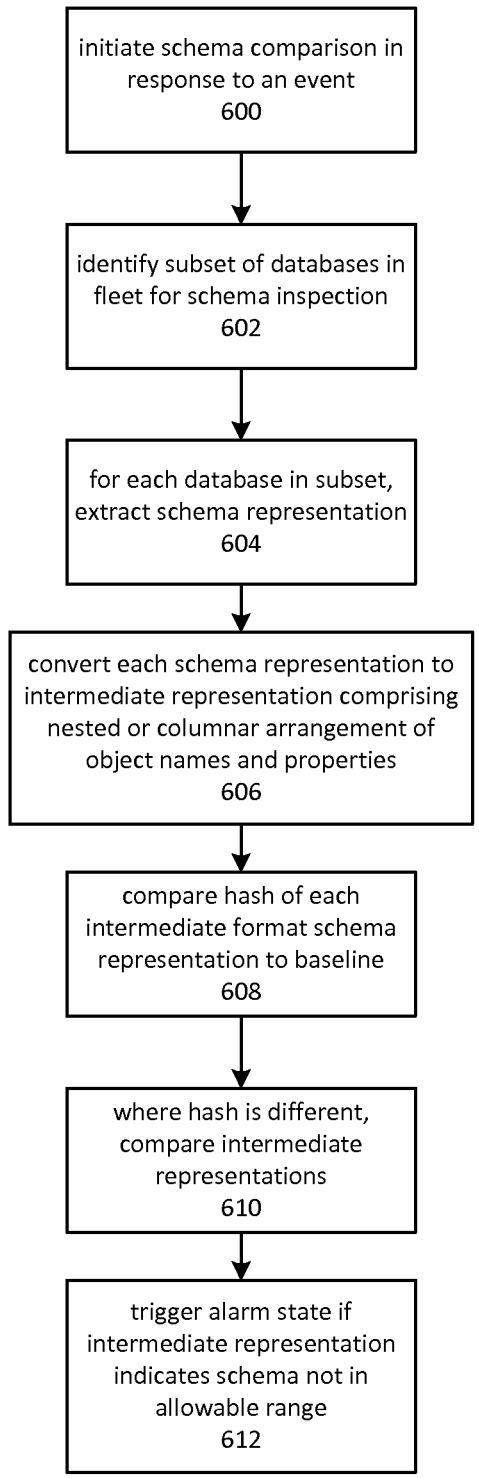
FIG. 6 is a flowchart depicting an embodiment of a process for comparing database schemas and triggering a response when there are discrepancies.

FIG. 6 depicts an embodiment of a process for comparing schemas and responding to schema discrepancies. Although depicted as a sequence of operations, those of ordinary skill in the art will appreciate that the depicted operations are intended to be illustrative and should not be construed as limiting the scope of the disclosure. Furthermore, those of ordinary skill in the art will appreciate that at least some of the depicted operations may be altered, omitted, reordered or performed in parallel.

Operation 600 depicts initiating a comparison of schema in response to an event. A wide variety of events may trigger a comparison. Non-limiting examples include upon request by an internal or external user, restoration of a computing device or database from backup, new database installations, new application installations, application upgrades, in response to unexplained failures and so forth. In some cases, scripts or other automated procedures may be employed to alter the schema used by a number of databases. These automated procedures may fail for various reasons. Accordingly, schema comparison may be performed after such events as a mechanism for detecting failures in the deployment of new database schemas.

Initiating a comparison, as depicted by operation 600, may be performed through a variety of manual and/or automated means. Embodiments may expose interfaces or protocols that allow a schema management module to be invoked to initiate a comparison. For example, a web service could be provided to allow for the initiation of a comparison. The web service might receive various parameters such as the internet protocol ("IP") address of the database to be used as the baseline, and a list of IP addresses for databases against which the baseline is compared. Embodiments might also allow for a baseline intermediate representation to be provided directly, instead of generating it each time from a reference database.

Operation 602 depicts identifying a subset of databases in a fleet of databases against which the baseline will be compared. As noted, a schema management module might accept a list of IP addresses of the databases to be compared against a reference schema. Embodiments may also detect a subset through automated means. For example, an embodiment might maintain a list of computing nodes or databases that have recently undergone downtime or experienced other errors. These may have developed a schema discrepancy and may be identified for investigation using the abilities of a schema management module.

Embodiments may perform monitoring of a fleet of databases to identify a subset of databases that might develop discrepancies in their schemas. For example, events such as database downtime, restoration from backup, application errors, database script errors and so forth might be monitored and tracked. On a periodic basis, embodiments may access records of databases that have experienced such events, and use the records to determine a subset of databases to perform schema inspection on. Databases that may be called upon to interact with new applications might also be included in the subset to be inspected.

As depicted by operation 604, for each database in the subset of databases to be inspected, schema information may be extracted and used as the bases of comparison with a baseline. Operation 606 depicts converting a set of schema information for a database to an intermediate representation. In some embodiments, the schema representation may comprise a columnar arrangement of object names with sets of associated properties. The arrangement may comprise rows of a fixed or variable number of columns. In some embodiments, the schema representation may comprise a set of nested elements. In yet another embodiment, the schema representation may comprise in-memory objects representative of columnar data or of nested relationships between objects, such as an object graph. These in-memory objects may be constructed to provide an abstract intermediate representation of the data, including representations of database objects, associated properties and information indicative of the order of the database object with respect to other database objects in the schema. A serialization format such as extensible markup language ("XML"), JavaScript Object Notation ("JSON") and so forth may be employed to store and exchange the intermediate representation.

Intermediate representations may be converted into a hash or checksum, which may be compared to a hash or checksum of a baseline intermediate representation to check for equality. In some embodiments, a more detailed inspection may be used if a hash key or checksum cannot be relied upon. This may be the case if correct ordering of the elements in an intermediate representation is not maintained. Some embodiments may perform a post-sorting operation on an intermediate representation prior to generating a hash or checksum, thereby obviating this issue.

Operation 608 depicts comparing hash or checksum values for the baseline against a hash or checksum for each database being examined. At operation 610, where hashes or checksums are different, a more detailed comparison of the intermediate representations may be performed. Embodiments may perform item-by-item comparison in order to identify which elements are different.

The baseline may comprise a database known to have a valid schema. Embodiments may receive an indication of which database is to serve as the baseline. An intermediate format of the baseline may be generated in the same manner as the databases whose schemas are being inspected.

Embodiments may also pre-generate baseline schemas for later use. A pre-generated schema may for example be stored in a repository, such as a version-controlled source code repository or a database table, and retrieved subsequently. Embodiments may also provide integration between application build procedures and schema management. For example, a schema management API may allow for a build process to interact with it to generate baseline versions of intermediate schemas during the build process. These may then be stored in a repository and retrieved or transmitted later. A schema management API may also allow for a version of a baseline to be registered so that it may be retrieved when needed for a comparison. The API may also allow the registered baseline to be associated with versioning and/or subclass information. Embodiments may store registered baselines in a repository such as a database.

At operation 612, an alarm state may be triggered if the comparison indicates that the schema is impermissibly inconsistent with respect to the baseline. Alarm state may be considered a general term describing a variety of potential responses. In some embodiments, a notification may be generated and sent to technical personnel for a response. Various reports, emails, text messages and so forth might be generated to indicate the deviation. Some embodiments may trigger automated recovery procedures. For example, a script might be triggered to attempt to update an out-of-date schema. Another possibility involves triggering a workflow that incorporates a mixture of human and automated intervention.

When a deviation with a known baseline is detected, some embodiments may perform a search of previous schema versions and subclasses. For example, referring back to FIG. 5, if database 504 does not conform to master schema 508, previous version 506 might be checked, as might permitted subclass 510. Embodiments may employ hash or checksum comparison for this purpose. In various cases and embodiments, an alarm may not be issued if database 504 matches a previous version and/or a permitted subclass. In other cases and embodiments, an alarm may be raised but with notification of the version of subclass that was identified.

Embodiments may provide for an alarm suppression mechanism for the case where a deviation is known and for which no alarm is considered necessary.

Figure 7:
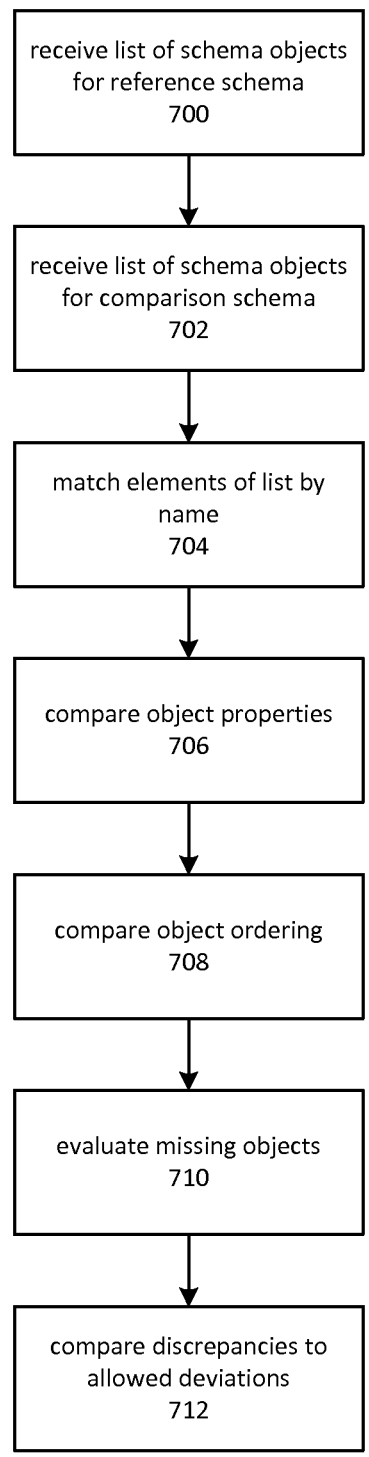
FIG. 7 is a flowchart depicting an embodiment of a process for comparing intermediate representations of schema.

FIG. 7 depicts an embodiment of a process for comparing two schemas. Although depicted as a sequence of operations, those of ordinary skill in the art will appreciate that the depicted operations are intended to be illustrative and should not be construed as limiting the scope of the disclosure. Furthermore, those of ordinary skill in the art will appreciate that at least some of the depicted operations may be altered, omitted, reordered or performed in parallel.

Operation 700 depicts receiving a list of information indicative of schema objects, such as information indicative of columns in a database table, view or index. The list may be ordered to preserve information such as the order in which columns appear in tables. Alternatively, ordering information may be provided as explicit values. The term ordered may be used to describe all or part of the list, regardless of the technique used to convey ordering information. In some embodiments, a list may contain sections that are ordered and sections that are not ordered. For example, ordering information might be conveyed for columns present in a table, view or index, but might not be conveyed for stored procedures.

Operation 700 refers to receiving a list of schema objects for a reference schema. Similarly, operation 702 depicts receiving a list of schema objects for a schema that is to be compared to a reference schema. In some embodiments, there may be little or no distinction between the schema considered to be a reference schema and the schema considered to be the target. However, embodiments may use designation as a reference schema to produce reports that describe changes to a target schema in terms of deviation from the reference schema.

At operation 704, the elements of the list may be matched by name. Embodiments may match by position if the lists are fully ordered. Otherwise, each element may be matched by name, for example by using the name of an object listed in the reference database as a key into the other list.

The list of schema objects may contain information indicative of various properties associated with the objects. For example, a column object may be represented in the list with the name of the column and a set of associated properties such as data type, length, collation and so forth. Operation 706 depicts comparing the properties of an object present in both lists. These may be referred to as a reference version of the object and a comparison version. A discrepancy may be noted if a property exists in one version of the object but not the other, or if the property exists in both versions of the object but has a different value in one of the versions.

Operation 708 depicts evaluating object ordering. Discrepancies may be noted if ordering information in the two lists indicates a difference in the ordering of certain object types. For example, discrepancies in column ordering may be noted. Some embodiments may note discrepancies in the ordering of any object type.

Operation 710 depicts evaluating the significance of any missing objects. Embodiments may note a discrepancy if either list contains an object not present in the other. In some embodiments, discrepancies may only be noted for certain object types present in one list but not the other. Embodiments may also ignore discrepancies for certain object types.

Noted discrepancies may be further evaluated against allowed deviations, as depicted by operation 712. Embodiments may receive information indicative of allowed deviations between a reference and comparison schema. In some embodiments, the information may be conveyed as additional properties associated with elements of the lists of schema objects. Embodiments may utilize additional reference schemas to indicate allowed deviations. These additional schemas may be evaluated in the event that discrepancies are detected between a primary reference schema and the comparison schema, as represented by the received lists of schema objects.

Figure 8:
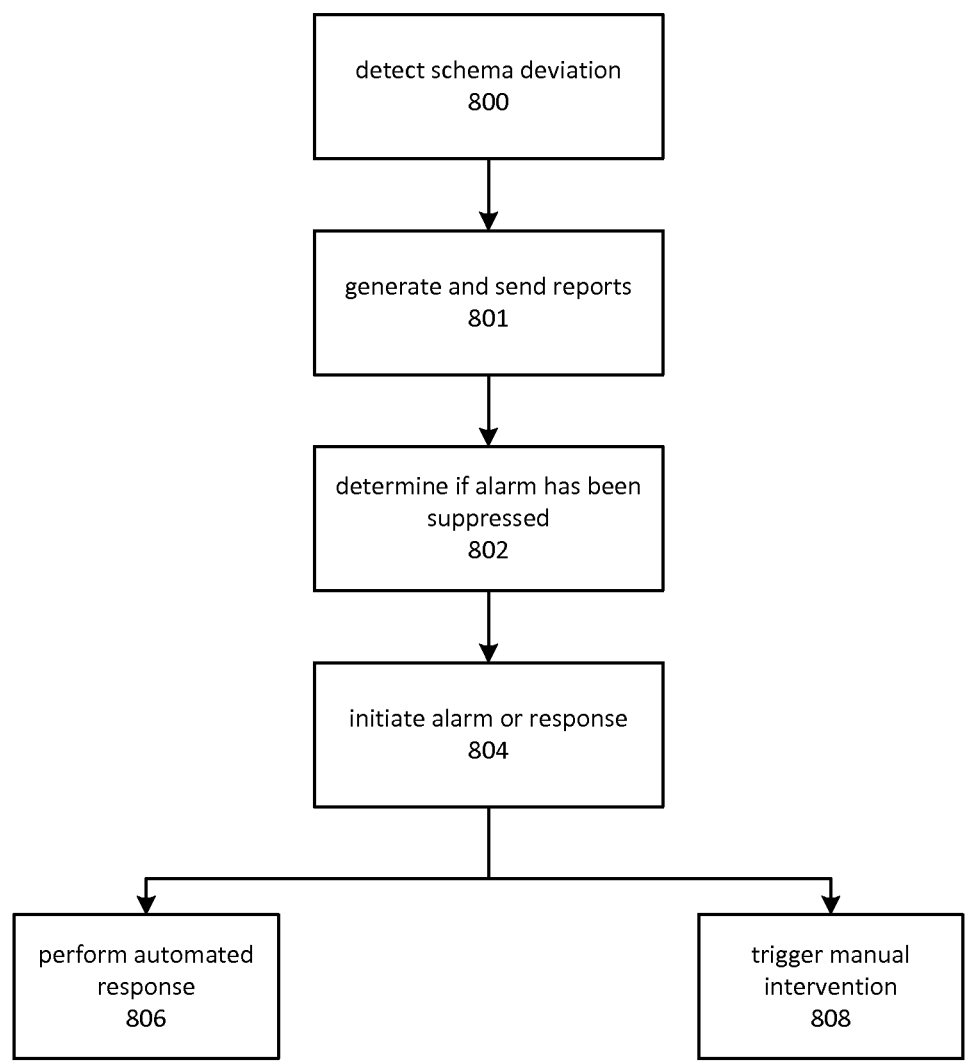
FIG. 8 is a flowchart depicting an embodiment of a process for responding to detected schema discrepancies.

FIG. 8 depicts an embodiment of a process for responding to schema variances. Various combinations of manual and automated responses may be triggered or orchestrated in response to a detected variance. Embodiments may, for example, trigger an alarm state to initiate and track responses to schema variations occurring within a fleet of databases. Although depicted as a sequence of operations, those of ordinary skill in the art will appreciate that the depicted operations are intended to be illustrative and should not be construed as limiting the scope of the disclosure. Furthermore, those of ordinary skill in the art will appreciate that at least some of the depicted operations may be altered, omitted, reordered or performed in parallel.

Operation 800 depicts detecting a schema deviation using various techniques and mechanisms described herein. Embodiments may trigger various forms of responses based on factors such as the type of deviation, affected hardware, affected database instances, affected customers and so on. The severity of the deviation may also be considered. For example, additive discrepancies may be considered less severe than subtractive discrepancies or differences in properties associated with objects common to baseline and comparison schemas.

For fleets of databases, a group of databases may be evaluated for deviations before an alarm is triggered. In this manner, embodiments may trigger a single response rather than many smaller separate responses. Embodiments may also analyze databases to classify related discrepancies. For example, a fleet might contain three groups of databases, one group having the desired reference schema, a second group having a variant thereof and a third group having another variant. Embodiments might trigger two alarms in that case.

Operation 801 may comprise determining a reporting strategy, generating reports, and sending reports. A reporting strategy may be based on a classification of the schema discrepancy. For example, when a deviation belongs to a known class of deviations, embodiments may generate a different format of reports or send reports to a different audience. Embodiments may employ classification to determine report recipients. Each schema may, for example, be associated with a list of email recipients.

Embodiments may generate reports by comparing discrepancies between schema objects. A report may comprise a listing of schema objects and information indicative of the nature of the deviation from the reference object. Reports may contain links or references to other resources that may be used to take corrective action. Those of ordinary skill in the art will appreciate that a wide variety of reports may be generated and send to various consumers of the information. Reports may be stored in an accessible location, so that information about the discrepancy may be accessed if an alarm or other notification is generated. In an embodiment, a client of a database hosted by a service provider may receive reports indicative of schema discrepancies for database hosted on the client's behalf by the service provider.

It may be the case that certain classes of discrepancies have already been responded to, or are considered inconsequential. Operation 802 depicts determining if an alarm or other response to a discrepancy has been suppressed. An alarm or other response may be suppressed based on a variety of factors, such as the identity of affected databases, affected hardware, the type of discrepancy and so forth. Embodiments may allow an alarm or other response to be suppressed if the database can be matched to at least one known reference schema.

Operation 804 depicts initiating an alarm or response. As depicted in FIG. 8, an alarm or response may be some combination of performing an automated response 806 and triggering manual intervention 808. Various non-limiting examples of performing an automated response are executing scripts that perform schema upgrades, taking databases offline, running diagnostic procedures and so forth. Triggering manual intervention may comprise generating reports, sending emails or text messages and so on. Embodiments may perform combinations of automated and manual procedures. For example, a mixed manual and automated workflow might be triggered to automatically take database instances offline and schedule immediate inspection of the affected database instances by technical personnel.

Figure 9:
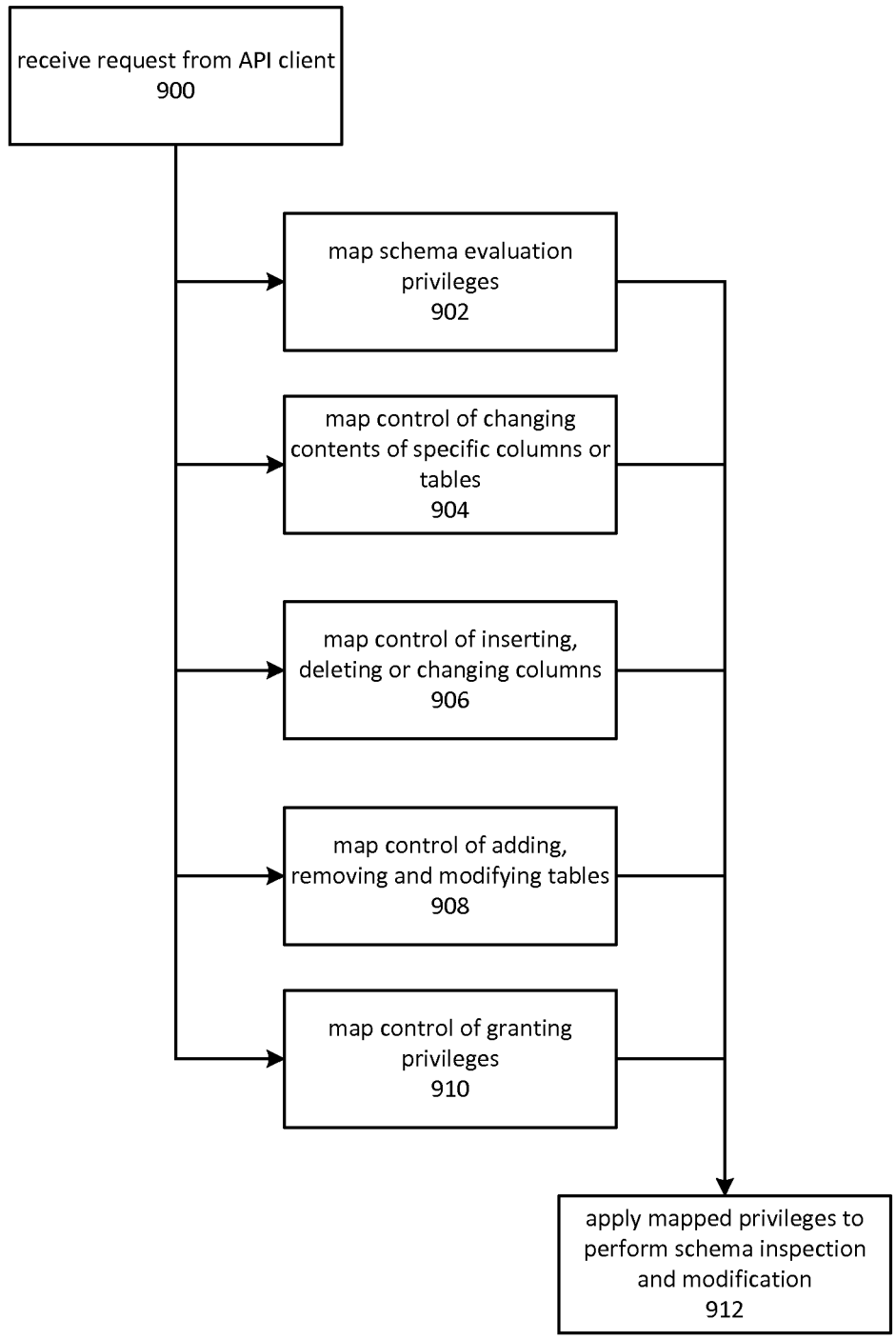
FIG. 9 is a flowchart depicting an embodiment of a process for mapping a security context of a client of a schema management module to the security context of a database.

FIG. 9 depicts an embodiment of a process for performing mapping of access rights during schema management. Although depicted as a sequence of operations, those of ordinary skill in the art will appreciate that the depicted operations are intended to be illustrative and should not be construed as limiting the scope of the disclosure. Furthermore, those of ordinary skill in the art will appreciate that at least some of the depicted operations may be altered, omitted, reordered or performed in parallel.

At operation 900, a request may be received from a client of a schema management module. The request may comprise credentials identifying the client. A client may be considered to be a user or process that invokes an API through the use of a protocol, interface and so forth. The client may, for example, invoke a web service through hypertext transfer protocol ("HTTP") in order to request that a function be performed on its behalf by a schema management module.

The permissible security attributes and access rights of the client may differ from that of the user accounts used in the underlying databases. For example, database users may comprise system administrator accounts, domain accounts and so forth which do not necessarily map directly to the client or process that is invoking the schema management API. The term database user may be referred to as the security context in which database operations are performed. The set of permissions accessible to the client or process may not directly correspond to those of the database security context. This may be the case when a single security context is used to invoke database operations on behalf of all multiple clients of a schema management module. In other words, although requests to perform schema management functions may be associated with different sets of credentials, a smaller number of database security contexts may be employed to perform those functions. Accordingly, mapping from credentials associated with a request to perform a schema management function to a database security context will involve a temporary expansion of access rights. Embodiments may limit the expansion of access rights to those necessary to perform the request schema management function.

Clients associated with schema management may be temporarily granted privileges, and/or granted privileges limited in scope to performing schema comparisons and bring out-of-date schemas into conformance. In FIG. 9, one or more of operations 902 through 910 may be performed to determine how security attributes and access rights should be mapped between clients of a schema management module and a security context used for database operations.

Operation 902 depicts mapping schema evaluation privileges. Embodiments may permit a subset of the underlying schema information contained in a database to be inspected. In one embodiment, a database contains multiple tables shared by different clients. A schema management module in this embodiment could map security attributes and access rights so that a given client is only able to view schema for the tables controlled by that particular client. Another embodiment involves providing a database as through a software-as-a-service architecture. A table might be hosted by a service provider on behalf of a client. The table might contain one or more columns that are used by the service provider, and not intended to be seen by the client. The mapping could therefore allow inspection of columns in the client's table, except for those columns used exclusively by the service provider.

Operation 904 depicts mapping control over changing the contents of specific columns or table. Typically, a database security context may be granted write privileges for a particular table. However, embodiments may provide a mapping that further restricts those rights, for example by allowing only specific values to be inserted, deleted or changed.

Embodiments may also map access rights and privileges related to inserting, deleting or changing columns, as depicted by operation 906. For example, instead of granting full control over the ability to add, change or delete columns—as might be done for an administrator's security context for a database—embodiments may allow for columns to be added but not deleted, or only to allow specific columns to be created. Embodiments may base mappings on comparison with an intermediate representation of a reference schema, permitting only those changes needed to bring a database into conformance with the reference schema.

Operation 908 depicts mapping control of adding, removing and modifying tables. Embodiments may, for example, allow for certain types of tables to be created, or allow only specific tables to be modified. As with columns and other privileges, embodiments may map control over table schema based on comparison with a reference schema.

Operation 910 depicts mapping control of granting privileges. Embodiments may, for example, permit migration of various access rights and privileges from one database to another. In the software-as-a-service context, for example, users of the service might be granted certain privileges for accessing data stored on behalf of a client. The privileges associated with users of the service may be mapped to one or more security contexts used with the underlying databases. Embodiments of a schema management module may map between the two and allow for service users to have consistent access rights when using the service, regardless of which underlying database is used to process requests on their behalf.

The term mapping is used to describe a process by which a client or process that accesses a schema management module may be granted an appropriate set of underlying rights and privileges in the underlying database security context. The term may also include performing additional functions to enable or disable rights as appropriate. Embodiments may employ a variety of mechanisms. One approach involves directly mapping between credentials of the client or process accessing a schema management module to a corresponding database security context. Embodiments may also act on behalf of a client or process to perform actions on the database that the client or process would not otherwise have access to. In addition, embodiments may restrict the set of operations that may be performed on behalf of a client. Operation 912 depicts performing some combination of these and similar approaches to apply mapped privileges to perform schema inspection or modification.

Embodiments of the present disclosure may be employed in conjunction with many types of database management systems ("DBMSs"). A DBMS is a software and hardware system for maintaining an organized collection of data on which storage and retrieval operations may be performed. The organized collection of data may be referred to as a database. A DBMS may maintain one or more databases. In a DBMS, data is typically organized by associations between key values and additional data. The nature of the associations may be based on real-world relationships that exist in the collection of data, or it may be arbitrary. Various operations may be performed by a DBMS, including data definition, queries, updates, and administration. Some DBMSs provide for interaction with the database using query languages such as structured query language ("SQL"), while others use APIs containing operations such as put and get and so forth. Interaction with the database may also be based on various protocols or standards, such as hypertext markup language ("HTML") and XML. A DBMS may comprise various architectural components, such as a storage engine that acts to store data one on or more storage devices such as solid-state drives.

Figure 10:
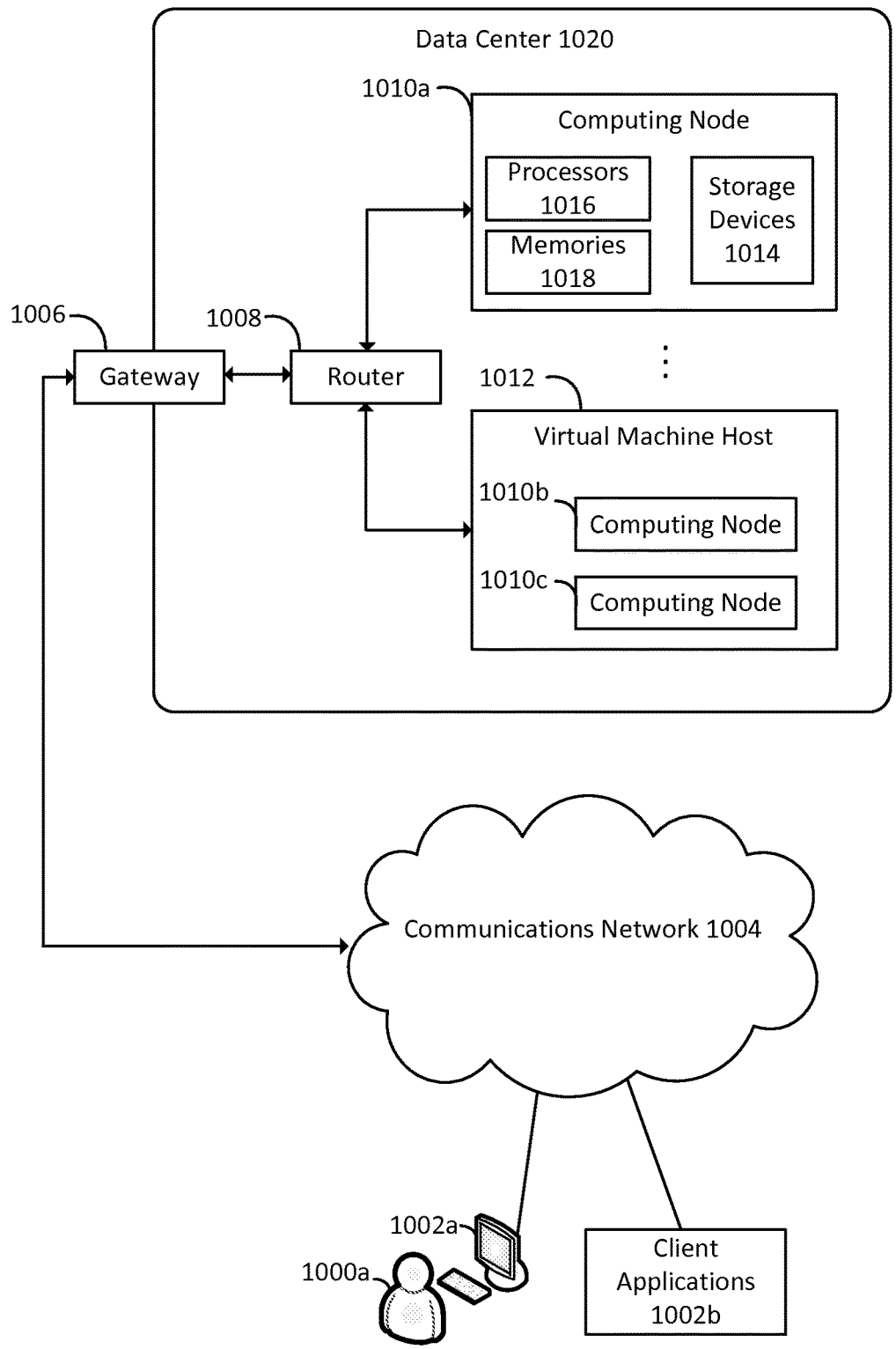
FIG. 10 is a block diagram depicting an embodiment of a computing environment in which aspects of the present disclosure may be practiced.

FIG. 10 is a diagram depicting an example of a distributed computing environment on which aspects of the present invention may be practiced. Various users 1000a may interact with various client applications, operating on any type of computing device 1002a, to communicate over communications network 1004 with processes executing on various computing nodes 1010a, 1010b and 1010c within a data center 1020. Alternatively, client applications 1002b may communicate without user intervention. Communications network 1004 may comprise any combination of communications technology, including the Internet, wired and wireless local area networks, fiber optic networks, satellite communications and so forth. Any number of networking protocols may be employed.

Communication with processes executing on the computing nodes 1010a, 1010b and 1010c, operating within data center 1020, may be provided via gateway 1006 and router 1008. Numerous other network configurations may also be employed. Although not explicitly depicted in FIG. 10, various authentication mechanisms, web service layers, business objects or other intermediate layers may be provided to mediate communication with the processes executing on computing nodes 1010a, 1010b and 1010c. Some of these intermediate layers may themselves comprise processes executing on one or more of the computing nodes. Computing nodes 1010a, 1010b and 1010c, and processes executing thereon, may also communicate with each other via router 1008. Alternatively, separate communication paths may be employed. In some embodiments, data center 1020 may be configured to communicate with additional data centers, such that the computing nodes and processes executing thereon may communicate with computing nodes and processes operating within other data centers.

Computing node 10 is depicted as residing on physical hardware comprising one or more processors 1016, one or more memories 1018 and one or more storage devices 1014. Processes on computing node 1010a may execute in conjunction with an operating system or alternatively may execute as a bare-metal process that directly interacts with physical resources such as processors 1016, memories 1018 or storage devices 1014.

Computing nodes 1010b and 1010c are depicted as operating on virtual machine host 1012, which may provide shared access to various physical resources such as physical processors, memory and storage devices. Any number of virtualization mechanisms might be employed to host the computing nodes.

The various computing nodes depicted in FIG. 10 may be configured to host web services, database management systems, business objects, monitoring and diagnostic facilities and so forth. A computing node may refer to various types of computing resources, such as personal computers, servers, clustered computing devices and so forth. When implemented in hardware form, computing nodes are generally associated with one or more memories configured to store computer-readable instructions, and one or more processors configured to read and execute the instructions. A hardware-based computing node may also comprise one or more storage devices, network interfaces, communications buses, user interface devices and so forth. Computing nodes also encompass virtualized computing resources, such as virtual machines implemented with or without a hypervisor, virtualized bare-metal environments, and so forth. A virtualization-based computing node may have virtualized access to hardware resources, as well as non-virtualized access. The computing node may be configured to execute an operating system, as well as one or more application programs. In some embodiments, a computing node might also comprise bare-metal application programs.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable storage medium or device, such as a hard disk, a memory, a network, or a portable media article to be read by an appropriate drive or via an appropriate connection. A computer-readable storage medium excludes signals per se.

The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations. Computer program products, systems, modules and so forth may be distributed across a number of computing nodes, such as between a client computing device and a server, possibly including one or more intermediary layers such as an application server, web server and so forth.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system comprising:
one or more database management systems managing a plurality of databases; and
one or more computing nodes configured at least to:
form a first representation of a first schema for a first database of the plurality of databases, the first representation comprising a first identifier of a column in the first database, a first set of properties corresponding to one or more properties of the column in the first database, and a first information indicative of an order of the column in the first database with respect to other columns in the first database;
identify at least a second database of the plurality of databases, the identification based at least in part on information indicative of an increased likelihood of a discrepancy between a second schema of the second database and the first schema of the first database;

form a second representation of the second schema for the second database, the second representation comprising a second identifier of a column in the second database, a second set of properties corresponding to one or more properties of the column in the second database, and a second information indicative of an order of the column in the second database with respect to other columns in the second database;

identify a discrepancy between the first schema and the second schema, based at least in part on comparing the first identifier to the second identifier, the first set of properties to the second set of properties, and the first information indicative of an order to the second information indicative of an order; and communicate information indicative of the discrepancy.

2. The system of claim 1, the one or more computing nodes further configured at least to:
identify the second database based at least in part on one or more of downtime of the second database, restoring the second database from backup, a failure indication for the second database, or installing an application that depends on the second database.

3. The system of claim 1, the one or more computing nodes further configured at least to:
receive a request to perform an operation involving the second schema, the request comprising a credential; and
perform a mapping from the credential to a security context associated with the second database, wherein the mapping comprises expanding access rights for the second database associated with the credential at least for a duration needed to perform the operation.

4. The system of claim 1, the one or more computing nodes further configured at least to:
compare the second representation to one or more additional representations of schemas of other databases in the plurality of databases, based at least in part on identifying the discrepancy between the first schema and the second schema.

5. The system of claim 1, the one or more computing nodes further configured at least to:
classify the discrepancy based at least in part on comparing at least one of the first identifier to the second identifier, the first set of properties to the second set of properties, or the first information indicative of an order to the second information indicative of an order.

6. A computer-implemented method of managing schema information in a plurality of databases, the method comprising:
forming a first representation of a first schema for a first database of the plurality of databases, the first representation comprising a first identifier of an object in the first database and a first property corresponding to a property of the object in the first database;
identifying at least a second database of the plurality of databases, the identification based at least in part on information indicative of an increased likelihood of a discrepancy between a second schema of the second database and the first schema of the first database;
forming a second representation of the second schema for the second database, the second representation comprising a second identifier of an object in the second database and a second property corresponding to a property of the object in the second database; and
identifying a discrepancy between the first schema and the second schema, based at least in part on comparing the first identifier to the second identifier and the first property to the second property.

7. The method of claim 6, wherein identifying the at least a second database is based at least in part on at least one of downtime for the second database, restoring the second database from backup, an error associated with the second database, or installing an application that depends on the second database.

8. The method of claim 6, wherein the information indicative of an increased likelihood of a discrepancy is a request to compare schema of the at least a second database to the schema of the first database.

9. The method of claim 6, further comprising:
monitoring the plurality of databases for an event which may result in the increased likelihood of a discrepancy.

10. The method of claim 6, further comprising:
receiving a request to perform an operation involving the second schema, the request comprising a credential; and
performing a mapping from the credential to a security context associated with the second database, wherein the mapping comprises expanding access rights for the second database associated with the credential for at least a duration needed to perform the operation.

11. The method of claim 6, further comprising:
comparing the second representation to one or more additional representations of schemas of other databases of the plurality of databases.

12. The method of claim 6, further comprising:
classifying the discrepancy based at least in part on a result of comparing at least one of the first identifier to the second identifier or the first property to the second property.

13. The method of claim 6, wherein the object is one of a table, view, index, column, constraint, or grant of privilege.

14. The method of claim 6, further comprising:
comparing the first representation with the second representation by at least comparing one of a hash key or checksum value of the first schema to a corresponding value of the second schema.

15. The method of claim 6, wherein the first representation is formed during an application build process.

16. The method of claim 6, further comprising:
retrieving the first representation from a repository.

17. The method of claim 6, further comprising:
receiving a request to synchronize schema of each of the plurality of databases, the request comprising an identifier of the first database; and
sending information indicative of the discrepancy between the first schema and the second schema.

18. One or more non-transitory computer-readable storage mediums having stored thereon instructions that, upon execution by one or more computing devices, cause the one or more computing devices at least to:
form a first representation of a first schema for a first database of a plurality of databases, the first representation comprising a first identifier of an object in the first database and a first property corresponding to a property of the object in the first database;
identify at least a second database of the plurality of databases, the identification based at least in part on information indicative of an increased likelihood of a discrepancy between a second schema of the second database and schema of the first database;

form a second representation of the second schema for the second database, the second representation comprising a second identifier of an object in the second database and a second property corresponding to a property of the object in the second database; and identify a discrepancy between the first schema and the second schema, based at least in part on comparing the first identifier with the second identifier and the first property with the second property.

19. The non-transitory computer-readable storage medium of claim 18, wherein the information indicative of an increased likelihood comprises information indicative at least one of downtime for the second database, restoring the second database from backup, a failure indication for the second database, or installing an application that depends on the second database.

20. The non-transitory computer-readable storage medium of claim 18, comprising further instructions that, upon execution by the one or more computing devices, cause the one or more computing devices at least to:

classify the discrepancy based at least in part on comparing at least one of the first identifier to the second identifier or the first property to the second property.

21. The non-transitory computer-readable storage medium of claim 18, comprising further instructions that, upon execution by the one or more computing devices, cause the one or more computing devices at least to:

monitor the plurality of databases for events which may result in the increased likelihood of schema discrepancies.

22. The non-transitory computer-readable storage medium of claim 18, comprising further instructions that, upon execution by the one or more computing devices, cause the one or more computing devices at least to:

calculate a hash key or checksum based at least in part on the second representation.

23. The non-transitory computer-readable storage medium of claim 18, comprising further instructions that, upon execution by the one or more computing devices, cause the one or more computing devices at least to:

store a hash key or checksum in a repository, the hash key or checksum based at least in part on the first representation.

24. The non-transitory computer-readable storage medium of claim 18, wherein at least one of the one or more computing devices is a client computing device, the non-transitory computer-readable storage medium comprising further instructions that, upon execution by the one or more computing devices, cause the one or more computing devices at least to:

transmit the first representation from the client computing device to a second computing device of the one or more computing devices; and transmit information indicative of updating the second schema, the information based at least in part on the discrepancy between the first schema and the second schema.

\* \* \* \* \*